US010995931B1

(12) United States Patent
Anderson et al.

(10) Patent No.: US 10,995,931 B1
(45) Date of Patent: May 4, 2021

(54) SSL LIGHTING APPARATUS

(71) Applicant: AUTOMATED ASSEMBLY CORPORATION, Lakeville, MN (US)

(72) Inventors: Aaron M. Anderson, Bloomington, MN (US); Scott Lindblad, Chaska, MN (US); David Neuman, Randolph, MN (US)

(73) Assignee: AUTOMATED ASSEMBLY CORPORATION, Lakeville, MN (US)

( * ) Notice: Subject to any disclaimer, the term of this patent is extended or adjusted under 35 U.S.C. 154(b) by 0 days.

(21) Appl. No.: 16/986,763

(22) Filed: Aug. 6, 2020

(51) Int. Cl.
*F21V 3/02* (2006.01)
*G02B 5/02* (2006.01)
*F21Y 115/00* (2016.01)

(52) U.S. Cl.
CPC .............. *F21V 3/02* (2013.01); *G02B 5/0215* (2013.01); *F21Y 2115/00* (2016.08)

(58) Field of Classification Search
CPC ....... F21V 3/02; G02B 5/0215; F21Y 2115/00
See application file for complete search history.

(56) References Cited

U.S. PATENT DOCUMENTS

| | | | |
|---|---|---|---|
| 4,447,859 | A | 5/1984 | Raczynski |
| 4,714,983 | A | 12/1987 | Raczynski |
| 5,461,547 | A | 10/1995 | Ciupke et al. |
| 5,562,971 | A | 10/1996 | Tsuru et al. |
| 5,598,382 | A | 1/1997 | Wilson et al. |
| 5,609,778 | A | 3/1997 | Pulaski et al. |
| 5,621,274 | A | 4/1997 | McGuigan |
| 5,811,930 | A | 9/1998 | Krafcik et al. |
| 5,817,243 | A | 10/1998 | Shaffer |
| 5,821,691 | A | 10/1998 | Richie et al. |
| 5,830,028 | A | 11/1998 | Zovko et al. |
| 5,842,297 | A | 12/1998 | Tung |
| 5,936,264 | A | 8/1999 | Ishinaga |
| 5,950,340 | A | 9/1999 | Woo |
| 6,371,637 | B1 | 4/2002 | Atchinson et al. |
| 6,388,780 | B1 | 5/2002 | Monaghan et al. |

(Continued)

FOREIGN PATENT DOCUMENTS

WO    2011/110175 A2    9/2011

OTHER PUBLICATIONS

Brooks et al, "Plasma Polymerization: A Versatile and Attractive Process for Conformal Coating," IPC APEX EXPO Conference Proceedings.

(Continued)

*Primary Examiner* — Joseph L Williams
(74) *Attorney, Agent, or Firm* — Crawford Maunu PLLC

(57) ABSTRACT

The disclosed lighting apparatus has a light-diffusive panel having opposing first and second faces bounded by one or more sides and having one or more channels extending inward from one of the one or more sides. A first conductor is disposed on the first face of the light-diffusive panel and is proximate a first side. The first conductor has a concave section disposed within a channel of the one or more channels. A second conductor is disposed on the second face of the light-diffusive panel and is proximate the first side. The second conductor has a concave section disposed within a channel. Solid-state lighting (SSL) elements have light emitting portions that face a second side that is adjacent to the first side of the light-diffusive panel, and the SSL elements are electrically coupled to the first conductor and to the second conductor.

15 Claims, 5 Drawing Sheets

(56) References Cited

U.S. PATENT DOCUMENTS

| | | |
|---|---|---|
| 6,624,569 B1 | 9/2003 | Pennaz et al. |
| 6,631,558 B2 | 10/2003 | Burgess |
| 6,664,645 B2 | 12/2003 | Kawai |
| 7,070,301 B2 | 7/2006 | Magarill |
| 7,108,414 B2 | 9/2006 | McCollum et al. |
| 7,165,863 B1 | 1/2007 | Thomas et al. |
| 7,210,838 B2 | 5/2007 | Sakurai |
| 7,336,895 B2 | 2/2008 | Okazaki |
| 7,355,562 B2 | 4/2008 | Schubert et al. |
| 7,537,374 B2 | 5/2009 | Schardt et al. |
| 7,559,684 B2 | 7/2009 | Okuda |
| 7,572,031 B2 | 8/2009 | Schultz et al. |
| 7,659,620 B2 | 2/2010 | Fernandez |
| 7,679,099 B2 | 3/2010 | Pang |
| 7,705,365 B2 | 4/2010 | Kurokawa et al. |
| 7,709,851 B2 | 5/2010 | Bader et al. |
| 7,717,605 B2 | 5/2010 | Shibata |
| 7,762,704 B2 | 7/2010 | Brychell |
| 7,850,358 B2 | 12/2010 | Hamada |
| 7,922,380 B2 | 4/2011 | Park |
| 7,959,343 B2 | 6/2011 | Ijzerman et al. |
| 7,973,327 B2 | 7/2011 | West |
| 7,989,838 B2 | 8/2011 | Ku |
| 7,990,512 B2 | 8/2011 | Yang |
| 8,002,436 B2 | 8/2011 | Wang et al. |
| 8,013,525 B2 | 9/2011 | Cok et al. |
| 8,029,163 B2 | 10/2011 | Chen et al. |
| 8,031,294 B2 | 10/2011 | Kim |
| 8,033,684 B2 | 10/2011 | Marshall et al. |
| 8,052,303 B2 | 11/2011 | Lo et al. |
| 8,061,882 B2 | 11/2011 | Bita et al. |
| 8,066,403 B2 | 11/2011 | Sanfilippo et al. |
| 8,083,238 B2 | 12/2011 | Borges |
| 8,235,574 B2 | 8/2012 | Hamada |
| 8,247,979 B2 | 8/2012 | Sun |
| 8,322,882 B2 | 12/2012 | Ward |
| 8,330,176 B2 | 12/2012 | Thompson et al. |
| 8,353,615 B2 | 1/2013 | Douglas et al. |
| 8,752,995 B2 | 6/2014 | Park |
| 8,864,357 B2 | 10/2014 | Kim |
| 9,128,222 B1 | 9/2015 | Lindblad et al. |
| 9,151,454 B1 | 10/2015 | Lindblad et al. |
| 9,606,285 B1 | 3/2017 | Lindblad et al. |
| 10,168,038 B1 | 1/2019 | Lindblad et al. |
| 10,168,463 B1 | 1/2019 | Neuman et al. |
| 10,317,614 B1 | 6/2019 | Lindblad et al. |
| 10,655,823 B1 | 5/2020 | Lindblad et al. |
| 2004/0130019 A1 | 7/2004 | Chen |
| 2005/0152146 A1 | 7/2005 | Owen et al. |
| 2008/0101084 A1 | 5/2008 | Hsu |
| 2009/0009997 A1 | 1/2009 | Sanfilippo et al. |
| 2012/0170317 A1 | 7/2012 | Tsai et al. |
| 2012/0287371 A1 | 11/2012 | Oura |
| 2012/0300495 A1 | 11/2012 | Kim et al. |
| 2012/0311857 A1 | 12/2012 | Kampfrath et al. |
| 2013/0050167 A1 | 2/2013 | Yamanaka |
| 2013/0099275 A1 | 4/2013 | Pi et al. |
| 2013/0121023 A1 | 5/2013 | Kwon et al. |
| 2013/0201721 A1 | 8/2013 | Tsai et al. |

OTHER PUBLICATIONS

Quinones et al., "Silicone-Phosphor Encapsulation for High Power White LEDs," ASYMTEK, Pan Pacific Symposium Conference Proceedings, ASYMTEK (Jan. 24, 2008).

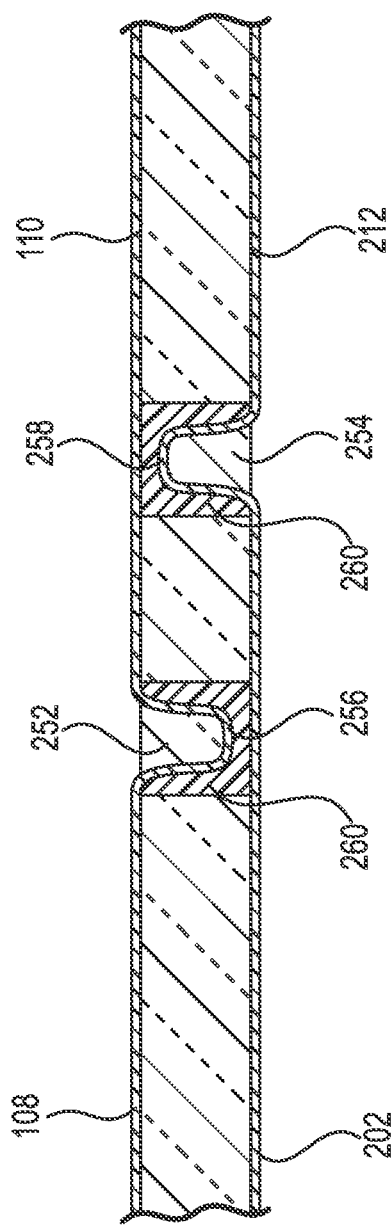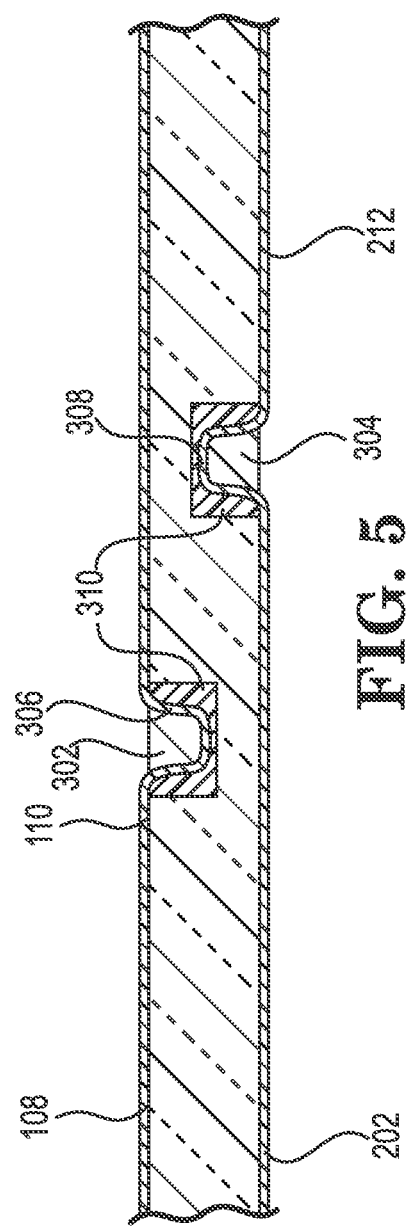

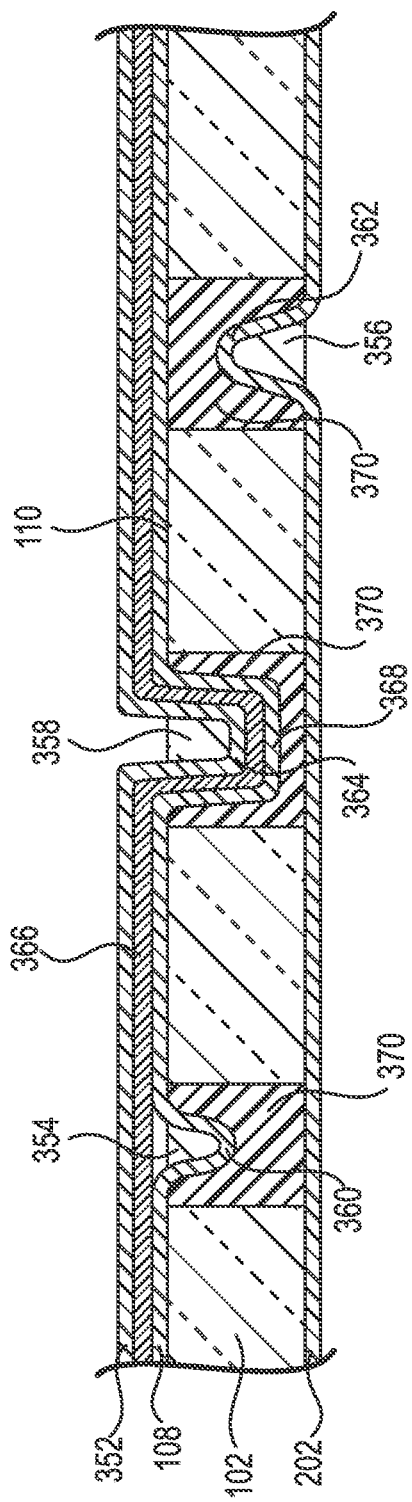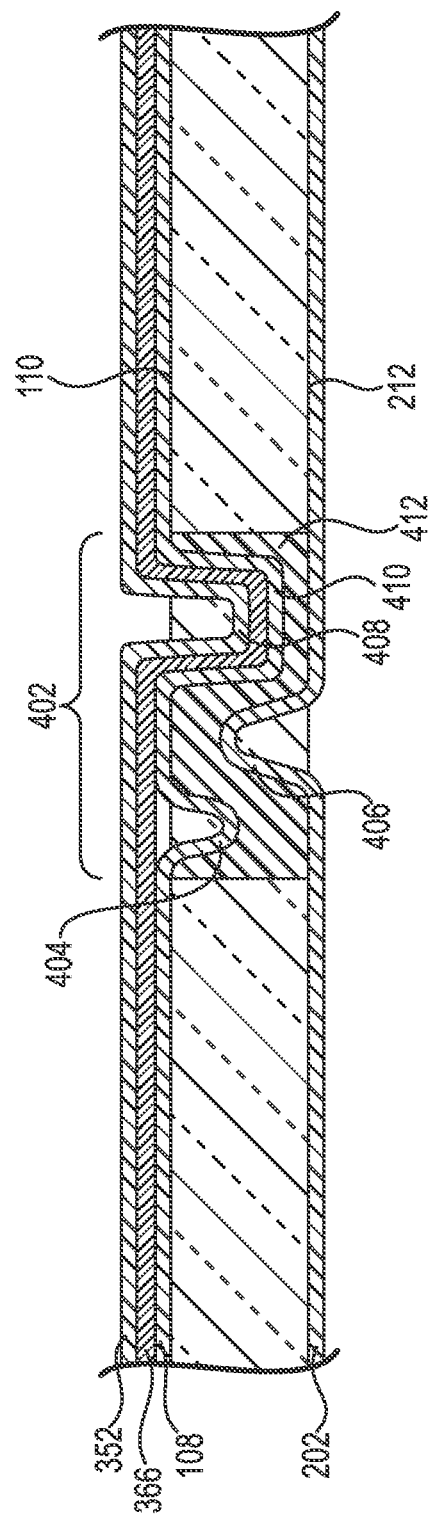

SSL LIGHTING APPARATUS

FIELD OF THE INVENTION

The disclosed embodiments generally relate to a solid-state lighting (SSL) apparatus.

BACKGROUND

Solid-state lighting (SSL) apparatuses have semiconductor structures that emit light. Examples of SSL lighting elements include light-emitting diodes (LEDs), semiconductor laser diodes (LDs), organic light-emitting diodes (OLED), polymer light-emitting diodes (PLED), and quantum dots. SSL is becoming more popular due in part to the energy efficient qualities and durability of SSL. Applications for SSL may include advertising signage, decorations, or utility and general purpose lighting. In some implementations, SSL elements are placed along one or more edges of a light-transmitting panel, and the light-transmitting panel is structured to evenly distribute light emitted from the SSL elements through a surface of the panel.

With an edge-lit light-transmitting panel, light from the SSL elements is spread evenly through the panel by total internal reflection. Disruptions formed on the surface of the panel scatter incident light so that light is emitted from the surface of the panel.

SUMMARY

A disclosed lighting apparatus includes a light-diffusive panel. The light-diffusive panel has opposing first and second faces bounded by one or more sides and has one or more channels extending inward from one of the one or more sides. The lighting apparatus includes a first conductor that is disposed on the first face of the light-diffusive panel and that is proximate a first side of the one or more sides. The first conductor has a concave section disposed within a channel of the one or more channels. A second conductor is disposed on the second face of the light-diffusive panel and is proximate the first side. The second conductor has a concave section disposed within a channel of the one or more channels. A plurality of solid-state lighting (SSL) elements have light emitting portions that face a second side that is adjacent to the first side of the light-diffusive panel. The plurality of SSL elements are electrically coupled to the first conductor and to the second conductor.

The above summary is not intended to describe each disclosed embodiment. The figures and detailed description that follow provide additional example embodiments and aspects.

BRIEF DESCRIPTION OF THE DRAWINGS

Other aspects and advantages will become apparent upon review of the Detailed Description and upon reference to the drawings in which:

FIG. 4 shows a cross-section of a channel portion of the light-diffusive panel and concave sections of conductors disposed in separate full channels;

FIG. 5 shows a cross-section of a channel portion of the light-diffusive panel and concave sections of conductors disposed in separate partial channels;

FIG. 6 shows a cross-section of a channel portion of the light-diffusive panel and concave sections of three conductors disposed in separate full channels, respectively; and FIG. 7 shows a cross-section of a channel portion of the light-diffusive panel and concave sections of three conductors disposed in a single full channel.

DETAILED DESCRIPTION

Figure 1:
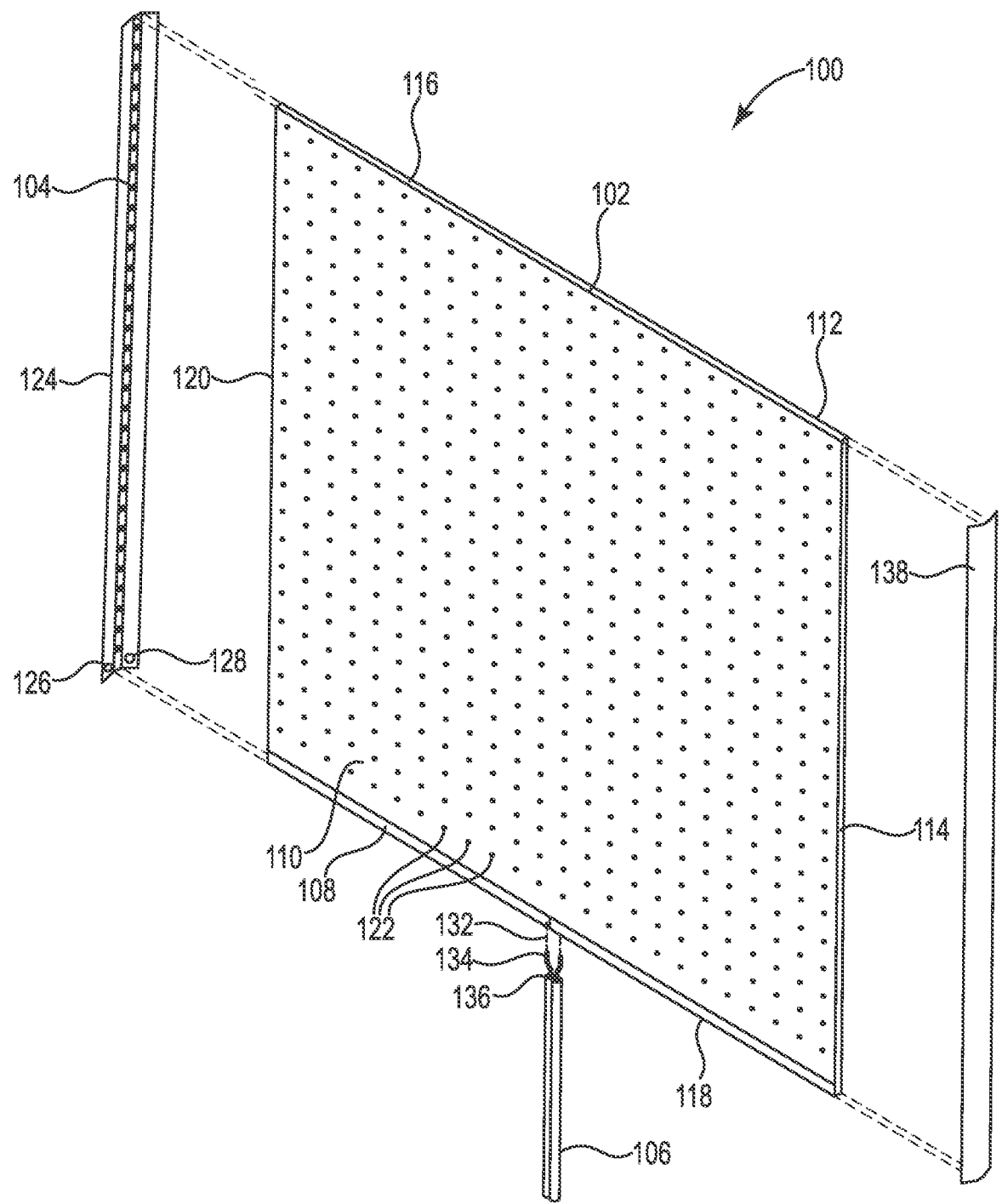
FIG. 1 shows a perspective view of an exemplary lighting apparatus.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Terms such as over, under, top, bottom, above, below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

This disclosure describes an SSL apparatus having a thin profile and economical construction. The SSL apparatus is adaptable for various applications including signage or general purpose lighting, for example. The lighting apparatus includes a light-diffusive panel, such as a sheet of acrylic, which can be of any thickness suitable for the intended application. The disclosed structures are especially suited for applications desiring a thin profile, such as a lighting apparatuses having acrylic sheets as thin as 2 mm. The light-diffusive panel can have generally planar opposing surfaces, though the opposing surfaces need not be planar. The opposing surfaces can be the front-side and the backside of the panel. Light is emitted from the front-side of the panel, and in some configurations both the front side and the back side of the panel when the lighting apparatus is powered.

Conductors for positive and negative power supply voltages are attached to the opposing surfaces of the panel and proximate one of the edges of the panel. Solid-state lighting (SSL) elements are disposed adjacent to one of the sides of the panel and the light emitting portions of the SSL elements face a side of the panel that is adjacent to the side of the panel having the conductors. The SSL elements are electrically coupled to the conductors on the panel.

The light-diffusive panel has one or more channels extending inward from the side having the conductors. Each of the conductors has a concave section that is disposed in a channel of the one or more channels. Terminal ends of power supply wires can be physically connected to the conductors on the panel at, and seated within, the concave sections. The channel(s) and concave sections allow the connections between the conductors and the power supply wires to be within the profile of the light-diffusive panel, rather than the connections adding to the profile of the lighting apparatus. That is, in exemplary configurations the terminal ends of the power supply wires do not rise above the surfaces of the panel.

The disclosed lighting apparatus is adaptable to different configurations of the channel(s). For example, the channel can be a notch in a side of the panel or a groove on the surface of the panel. Some lighting apparatuses can have multiple channels, and the channels can be of the same configuration (e.g., all notches or all grooves) or the channels can be different (e.g., a combination of a notch(es) and a groove(s).

Different lighting apparatus consistent with the disclosed teachings can have different numbers and sizes of channels. Some structures can accommodate coupling one or more control wires to the SSL elements. A light-diffusive panel can have a larger channel or an additional channel to accommodate the connection between an end of a control wire from an external source and a control conductor attached to the panel.

The lighting apparatus can be structured to accommodate a number of different types conductors and power wires. The conductors attached near an edge of the panel can be a metal foil or a strand of round wire. The power supply wires can be a single strand of round wire, braided or twisted strands of wire, or a flat wire.

FIG. 1 shows a perspective view of an exemplary lighting apparatus 100. The major components of the lighting apparatus include a light-diffusive panel 102, SSL elements 104, a power supply cable 106, and power distribution strips, only one (108) of which is visible in the perspective view shown in FIG. 1. The light-diffusive panel 102 has opposing faces, such as a first face 110 and a second face 112 (which is not visible in the FIG. 1 perspective) that are bounded by one or more sides. In the illustrated example, the light-diffusive panel is rectangular and has four sides, with sides 114 and 116 exposed and sides 118 and 120 hidden in the view. In one implementation, the light-diffusive panel is made from a transparent thermoplastic such as polymethyl methacrylate (PMMA or "acrylic glass"). The light-diffusive panel 102 may be any polygon or a shape bounded by one or more curved sides, such as a circle, ellipse, or an irregular shape.

With an edge-lit lighting apparatus, light from the SSL elements is spread evenly through the light-diffusive panel by total internal reflection. Disruptions 122 in the surface of one or both of the faces of the panel scatter incident light so that light is emitted from the faces of the panel. The lighting apparatus can further include a reflective material (not shown) disposed on one of the faces 112 so that light is emitted only from the other face 110.

The SSL elements 104 can be disposed on a carrier 124 such as a flexible or rigid substrate. In some implementations, the carrier can include a copper layer and flexible dielectric layers disposed on opposing surfaces of the copper layer. The carrier can be attached to the light-diffusive panel, such as by pressure sensitive adhesive (PSA), such that the SSL elements 104 face the side (or "edge") 120 and emit light into the panel.

Figure 2:
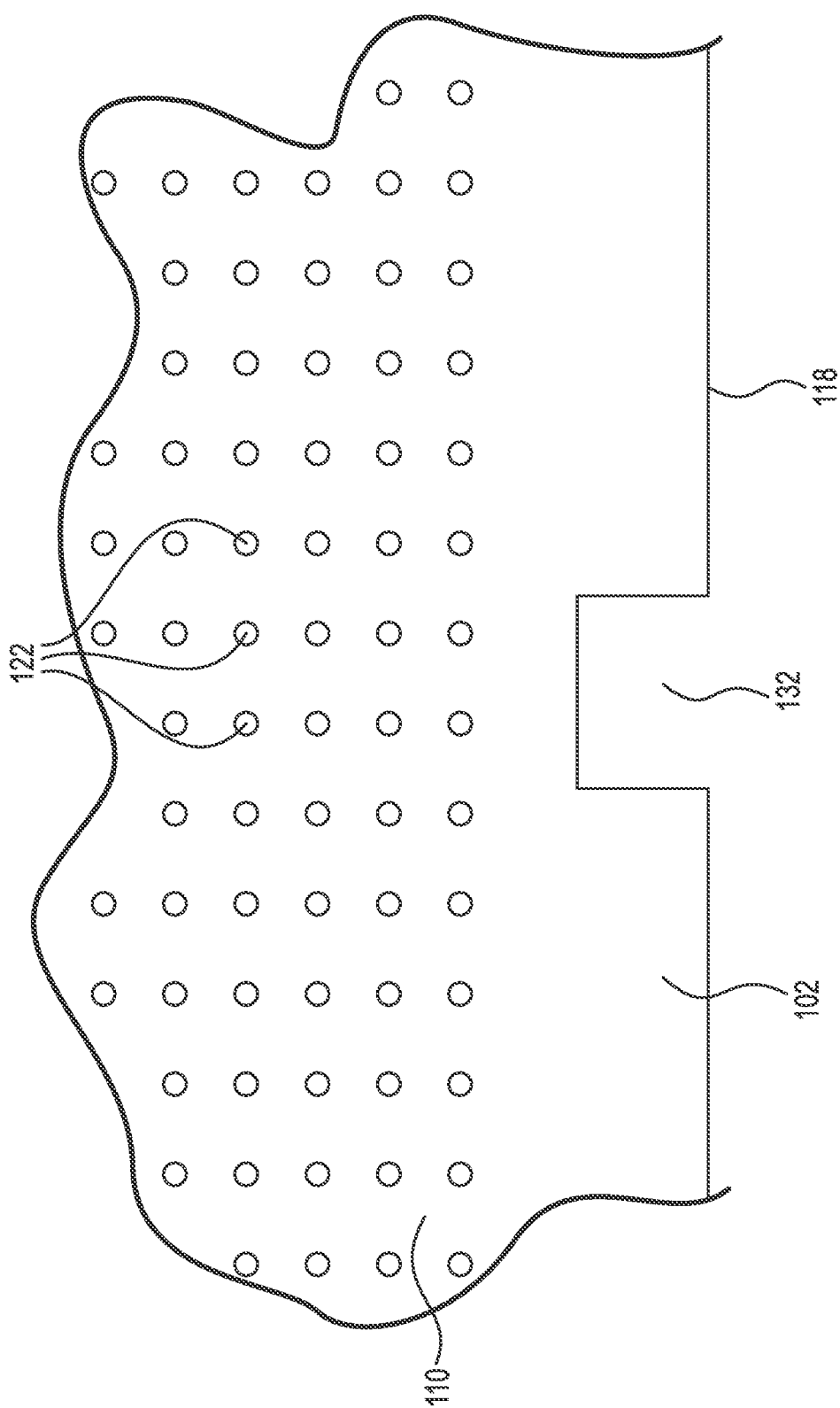
FIG. 2 shows a top view of a portion of a light-diffusive panel.

Power can be delivered to the SSL elements 104 by way of the power supply cable 106 and power distribution strips, which are conductors disposed on the faces 110 and 112 of the light-diffusive panel 102. The conductor on the face 110 is shown as conductor 108. The conductor on the second face is shown in FIG. 2.

The conductor 108 is disposed proximate side 118 on the face 110 of the light-diffusive panel. The corresponding conductor (FIG. 3, #202) on the other face is similarly disposed. The conductors can be constructed with metal foil or wire having a round cross-section. The conductors can be attached to the surfaces of the light-diffusive panel with a PSA, for example. Additionally, a layer of PSA can be deposited directly on desired areas of the panel, and the conductors can be placed directly on the layer of PSA.

The SSL elements 104 are electrically coupled to the conductor 108 through the copper layer of the carrier 124 and the exposed connection point 126. Exposed connection point 128 can be connected to the conductor on the other face of the panel.

The panel 102 can have one or more channels that provide space for connecting the conductors in the power cable 106 to the conductor 108 on face 110 and the conductor (not shown) on the face 112 of the panel 102. Each channel extends inward from the side 118 of the panel. Within each channel, one of conductors has a concave section at which a terminal end of a conductor of the power cable 106 can be connected. For example, the terminal end 134 of conductor 136 can be connected to the concave portion of conductor 108 within the channel 132. In other configurations, the power cable 106 can include one or more control conductors in addition to the positive and negative voltage conductors. The conductors of the power cable 106 can be flat wire, round wire, twisted wire, or braided wire, for example.

The conductor 108 is shown as extending from side 114 to side 120 of the light-diffusive panel. However, it will be recognized that in implementations having a series of SSL elements 104 disposed only one one side of the panel, the conductor need only extend from the channel 132 to the side having the SSL elements. In some implementations (not shown), multiple series of SSL elements can be attached to the light diffusive panel 102. For example, a second series of SSL elements on strip 138 can be attached to side 114 of the panel and electrically connected to the conductors (e.g., 108) on the faces 110 and 112 of the panel. Another implementation can include a series of SSL elements attached to side 116, side 118 or both, in which case the conductor 108 could be connected to another conductor disposed on the face 110 proximate side 114 or side 120. The other face 112 can have a similar conductor arrangement.

FIG. 2 shows a top view of a portion of the panel 102. The top view shows the channel 132 that extends inward to the panel from the side 118. In the exemplary configuration, the channel extends through the panel from the face 110 to the opposite face (not shown). The channel can be formed by laser ablation, for example. The top view also shows the disruptions 122 on the surface 110.

Figure 3:
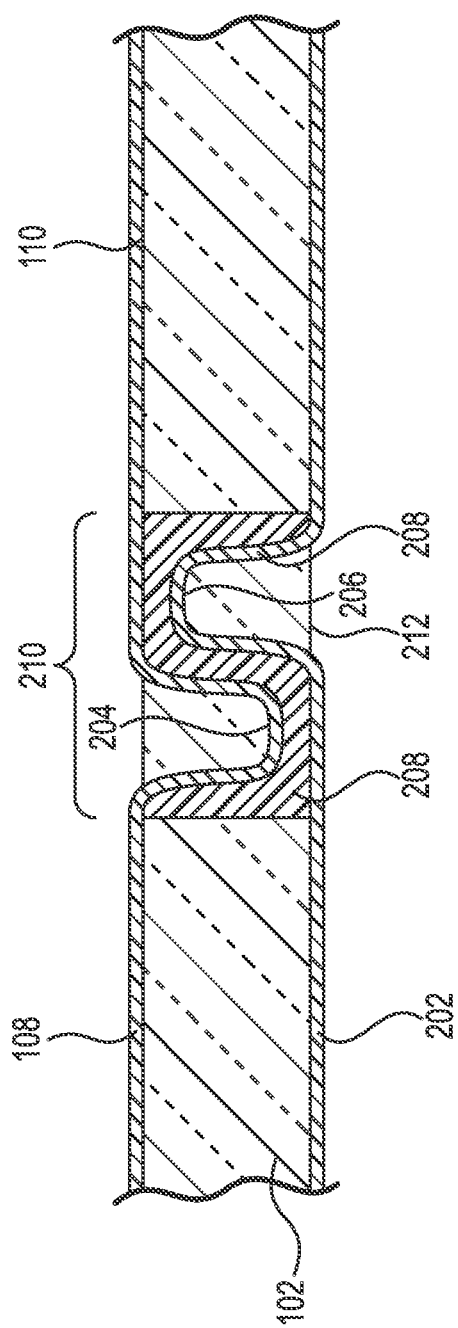
FIG. 3 shows a cross-section of a channel portion of the light-diffusive panel and concave sections of conductors disposed in the channel.

FIG. 3 shows a cross-section of a channel portion of the panel 102 having concave sections of conductors 108 and 202 disposed in the channel 210. The channel 210 extends through the panel from the face 110 to the opposite face 212. Conductor 108 has concave section 204 disposed in the channel, and conductor 202 has concave section 206 disposed in the channel. The concave sections of the conductors can be separated by an air-filled gap or by a dielectric material, as shown by element 208. The shape of the concave sections can be curved or have defined edges that mark separate portions of a concave section, or a combination thereof. The concave sections can be formed by a roller pin forced against the panel as the conductor is laid on the panel. Alternatively, the concave portion can be preformed by a press and mold.

Terminal ends of wires (not shown) of a power cable can be connected at the concave sections 204 and 206 of the conductors 108 and 202. For example, the terminal end of a conductor (not shown) carrying the positive supply voltage can be connected to the concave portion 204, and the terminal end of a conductor (not shown) carrying the negative supply voltage can be connected to the concave portion 206.

FIG. 4 shows a cross-section of a channel portion of the panel 102 having concave sections of conductors 108 and 202 disposed in separate channels 252, and 254. The channels 252 and 254 extend through the panel from the face 110 to the opposite face 212. Conductor 108 has concave section 256 disposed in the channel 252, and conductor 202 has concave section 258 disposed in the channel 254. The portions of the channels not occupied by the concave sections of the conductors can be filled with air or a dielectric material, as shown by element 260. The shape of the concave sections can be curved or have defined edges that mark separate portions of a concave section, or a combination thereof.

Terminal ends of a power cable can be connected at the concave sections 256 and 258 of the conductors 108 and 202. For example, the terminal end of a conductor (not shown) carrying the positive supply voltage can be connected to the concave portion 256, and the terminal end of a conductor (not shown) carrying the negative supply voltage can be connected to the concave portion 258.

FIG. 5 shows a cross-section of a channel portion of the panel 102 having concave sections of conductors 108 and 202 disposed in separate channels 302, and 304. The channels 302 and 304 do not extend through the panel. Rather, the channels are grooves formed in the faces 110 and 212. Conductor 108 has concave section 306 disposed in the channel 302, and conductor 202 has concave section 308 disposed in the channel 304. The portions of the channels not occupied by the concave sections of the conductors can be filled with air or a dielectric material, as shown by element 310. The shape of the concave sections can be curved or have defined edges that mark separate portions of a concave section, or a combination thereof.

Terminal ends of a power cable can be connected at the concave sections 306 and 308 of the conductors 108 and 202. For example, the terminal end of a conductor (not shown) carrying the positive supply voltage can be connected to the concave portion 306, and the terminal end of a conductor (not shown) carrying the negative supply voltage can be connected to the concave portion 308.

A channel that extends through the panel from one face to the opposing face, as in FIG. 3, can be referred to as a "full channel," and a channel that does not extend through the panel from one face to the opposing face, as in FIG. 5, can be referred to as a "partial channel." The channel portions of different configurations of lighting arrangements can include different combinations of one or more full channels and/or one or more partial channels. A panel can have more than two channels to accommodate control conductors from a power cable.

FIG. 6 shows a cross-section of a channel portion of the panel 102 having concave sections of conductors 108, 202, and 352 disposed in separate channels 354, 356, and 358, respectively. The channels 354, 356, and 358 extend through the panel from the face 110 to the opposite face 212. In alternative configurations, one or more of the full channels 354, 356, or 358 could instead be partial channels.

Conductor 108 has concave section 360 disposed in the channel 354, conductor 202 has concave section 362 disposed in the channel 356, and conductor 352 has concave section 364 disposed in the channel 358. In addition to positive and negative supply voltages, one of the conductors 108, 202, or 352 can carry control signals to the SSL carrier(s) 124 (FIG. 1). Because the conductor 352 is stacked on conductor 108 (and separated by a dielectric 366), conductor 108 has a second concave section 368 in channel 358.

The portions of the channels not occupied by the concave sections of the conductors can be filled with air or a dielectric material, as shown by element 370. The shape of the concave sections can be curved or have defined edges that mark separate portions of a concave section, or a combination thereof.

Terminal ends of a power cable can be connected at the concave sections 360, 362, and 364 of the conductors 108 and 202. For example, the terminal end of a conductor (not shown) carrying the positive supply voltage can be connected to the concave portion 360, the terminal end of a conductor (not shown) carrying the negative supply voltage can be connected to the concave portion 362, and the terminal end of a conductor (not shown) carrying a control signal can be connected to the concave portion 364.

FIG. 7 shows a cross-section of a channel portion of the panel 102 having concave sections of conductors 108, 202, and 352 disposed in the channel 402. The channel 402 extends through the panel from the face 110 to the opposite face 212. Conductor 108 has concave section 404 disposed in the channel, conductor 202 has concave section 406 disposed in the channel, and conductor 352 has concave section 408 disposed in the channel. Because the conductor 352 is stacked on conductor 108 (and separated by a dielectric 366), conductor 108 has a second concave section 368 in channel 402.

The concave sections of the conductors can be separated by an air-filled gap or by a dielectric material, as shown by element 412. The shape of the concave sections can be curved or have defined edges that mark separate portions of a concave section, or a combination thereof. The concave sections can be formed by a roller pin forced against the panel as the conductor is laid on the panel. Alternatively, the concave portion can be preformed by a press and mold.

Terminal ends of wires (not shown) of a power cable can be connected at the concave sections 404, 406, and 408 of the conductors 108, 202, and 352, respectively. For example, the terminal end of a conductor (not shown) carrying the positive supply voltage can be connected to the concave portion 404, the terminal end of a conductor (not shown) carrying the negative supply voltage can be connected to the concave portion 406, and the terminal end of a conductor (not shown) carrying a control signal can be connected to the concave portion 408.

Though aspects and features may in some cases be described in individual figures, it will be appreciated that features from one figure can be combined with features of another figure even though the combination is not explicitly shown or explicitly described as a combination.

The present invention is thought to be applicable to a variety of lighting applications. Other aspects and embodiments will be apparent to those skilled in the art from consideration of the specification and practice disclosed herein. It is intended that the disclosed apparatus and method be considered as examples only, with a true scope of the invention being indicated by the following claims.

What is claimed is:

1. A lighting apparatus, comprising:
   a light-diffusive panel having opposing first and second faces bounded by one or more sides and having one or more channels extending inward from one of the one or more sides;
   a first conductor disposed on the first face of the light-diffusive panel and proximate a first side of the one or more sides, wherein the first conductor has a concave section disposed within a channel of the one or more channels;
a second conductor disposed on the second face of the light-diffusive panel and proximate the first side, wherein the second conductor has a concave section disposed within a channel of the one or more channels;
a first plurality of solid-state lighting (SSL) elements having light emitting portions that face a second side that is adjacent to the first side of the light-diffusive panel, the first plurality of SSL elements electrically coupled to the first conductor and to the second conductor.

2. The lighting apparatus of claim 1, wherein:
one channel of the one or more channels extends through the light-diffusive panel from the first face to the second face; and
the concave section of the first conductor and the concave section of the second conductor are disposed in the one channel.

3. The lighting apparatus of claim 1, wherein the one or more channels includes a first channel and a second channel, the concave section of the first conductor is disposed within the first channel, and the concave section of the second conductor is disposed within the second channel.

4. The lighting apparatus of claim 3, wherein at least one of the first channel or the second channel extends through the light-diffusive panel from the first face to the second face.

5. The lighting apparatus of claim 3, wherein at least one of the first channel or the second channel is a groove in the first face or the second face.

6. The lighting apparatus of claim 1, further comprising:
a first dielectric layer disposed on the first conductor;
a third conductor disposed on the first dielectric layer, wherein the third conductor has a concave section;
wherein the one or more channels includes a first channel, a second channel, and a third channel; and
wherein the concave section of the first conductor is disposed within the first channel, the concave section of the second conductor is disposed within the second channel, and the concave second of the third conductor is disposed within the third channel.

7. The lighting apparatus of claim 1, further comprising:
a power cable that includes a third conductor and a fourth conductor; and
wherein a terminal end of the third conductor is connected to the first conductor at the concave section of the first conductor, and a terminal end of the fourth conductor is connected to the second conductor at the concave section of the second conductor.

8. The lighting apparatus of claim 7, wherein the third conductor and the fourth conductor are one of flat wire, round wire, twisted wire, or braided wire.

9. The lighting apparatus of claim 1, wherein the first and second conductors comprise metal foil.

10. The lighting apparatus of claim 1, wherein the first and second conductors comprise wires that have round cross-sections.

11. The lighting apparatus of claim 1, wherein the first conductor and the second conductor are attached to the light-diffusive panel by a pressure-sensitive adhesive.

12. The lighting apparatus of claim 1, wherein the first plurality of SSL elements are disposed on a carrier tape, and the carrier tape is attached to the light-diffusive panel by a pressure-sensitive adhesive.

13. The lighting apparatus of claim 12, wherein the carrier tape includes a copper layer and dielectric layers on opposing surfaces of the copper layer.

14. The lighting apparatus of claim 1, further comprising a second plurality of SSL elements having light emitting portions that face a third side that is adjacent to the first side of the light-diffusive panel, wherein the second plurality of SSL elements are electrically coupled to the first conductor and to the second conductors.

15. The lighting apparatus of claim 1, further comprising:
a second plurality of SSL elements having light emitting portions that face a third side that is adjacent to the first side of the light-diffusive panel, wherein the second plurality of SSL elements are electrically coupled to the first conductor and to the second conductors;
a third plurality of SSL elements having light emitting portions that face the first side of the light-diffusive panel, wherein the third plurality of SSL elements are electrically coupled to the first conductor and to the second conductors;
a fourth plurality of SSL elements having light emitting portions that face a fourth side that is opposite the first side of the light-diffusive panel, wherein the fourth plurality of SSL elements are electrically coupled to the first conductor and to the second conductor.

* * * * *